(12) United States Patent
Kim et al.

(10) Patent No.: US 9,005,387 B2
(45) Date of Patent: Apr. 14, 2015

(54) METHOD FOR FABRICATING A WINDOW MEMBER OF THE DISPLAY DEVICE OF A PORTABLE TERMINAL

(75) Inventors: Myung-Gon Kim, Gyeonggi-do (KR); Jong-In Ryu, Seoul (KR); Jin-Wook Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 102 days.

(21) Appl. No.: 13/405,475

(22) Filed: Feb. 27, 2012

(65) Prior Publication Data

US 2013/0000822 A1  Jan. 3, 2013

(30) Foreign Application Priority Data

Jun. 28, 2011 (KR) ........................ 10-2011-0063204

(51) Int. Cl.
*B29C 45/14* (2006.01)
*B32B 17/10* (2006.01)
*B32B 37/10* (2006.01)
*B32B 37/12* (2006.01)

(52) U.S. Cl.
CPC ........ *B32B 17/10816* (2013.01); *H04B 1/3888* (2013.01); *B32B 37/10* (2013.01); *B32B 2037/1253* (2013.01); *B32B 2307/412* (2013.01); *B32B 2457/00* (2013.01); *B32B 2457/208* (2013.01)

(58) Field of Classification Search
USPC .............. 156/272.2, 275.3, 275.5, 275.7, 99, 156/107, 228, 242, 245
See application file for complete search history.

(56) References Cited

U.S. PATENT DOCUMENTS

| | | | |
|---|---|---|---|
| 2004/0027327 A1* | 2/2004 | LeCain et al. ................ | 345/107 |
| 2004/0237422 A1* | 12/2004 | Tat et al. ....................... | 52/79.1 |
| 2007/0176322 A1* | 8/2007 | Etter et al. .................... | 264/255 |
| 2008/0218839 A1* | 9/2008 | Paolini et al. ................. | 359/274 |
| 2009/0059485 A1* | 3/2009 | Lynch et al. ............. | 361/679.01 |
| 2009/0218041 A1* | 9/2009 | Dean et al. .................... | 156/305 |
| 2009/0288756 A1* | 11/2009 | Dunn et al. .................... | 156/107 |
| 2010/0226116 A1* | 9/2010 | Brainard ........................ | 362/84 |
| 2011/0012842 A1* | 1/2011 | Lee et al. ....................... | 345/173 |

FOREIGN PATENT DOCUMENTS

| | | | |
|---|---|---|---|
| KR | 10-2006-0129848 A | | 12/2006 |
| WO | WO 2009016388 A1 | * | 2/2009 |
| WO | WO 2010058335 A2 | * | 5/2010 |

* cited by examiner

*Primary Examiner* — Daniel McNally
(74) *Attorney, Agent, or Firm* — Cha & Reiter, LLC.

(57) ABSTRACT

A method for fabricating a window member for a display device of a portable terminal includes: fabricating a high-hardness sheet to be attached to a surface of the window member ('sheet fabrication step'), fabricating a body of the window member with a high-polymer synthetic resin ('body fabrication step'), and attaching the high-hardness sheet to an outer surface of the body ('attaching step'), in which the outer surface of the body is formed to have a curved surface in the body fabrication step.

18 Claims, 5 Drawing Sheets

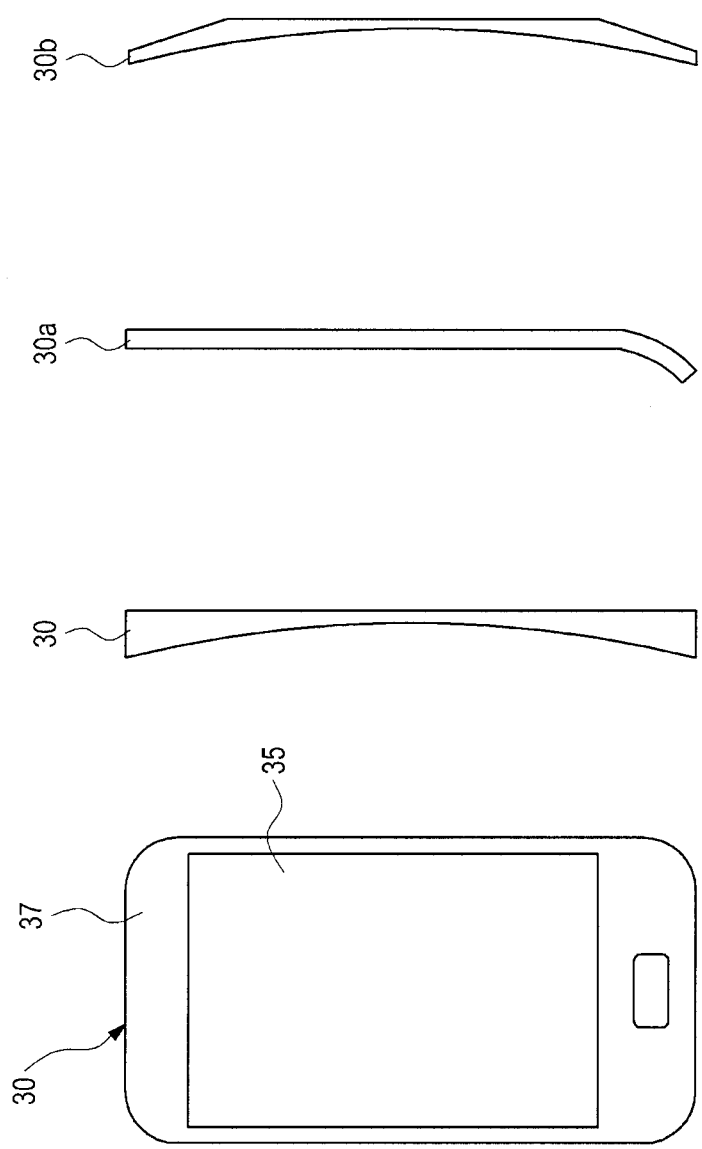

METHOD FOR FABRICATING A WINDOW MEMBER OF THE DISPLAY DEVICE OF A PORTABLE TERMINAL

CLAIM OF PRIORITY

This application claims the benefit under 35 U.S.C. §119(a) of a Korean Patent Application filed in the Korean Intellectual Property Office on Jun. 28, 2011 and assigned Serial No. 10-2011-0063204, the entire disclosure of which is hereby incorporated by reference.

BACKGROUND OF THE INVENTION

1. Field of the Invention

The present invention relates to a display device of a portable terminal, and more particularly, to a method of fabricating a window member of the display device.

2. Description of the Related Art

Generally, a portable terminal such as a mobile communication terminal and other portable multimedia devices includes a display unit and a transparent window member mounted on the display unit for protection.

Using a display screen, a portable terminal user performs various operations through an input device such as a separate keypad, a track pad, or the like. However, as functions, such as Internet access, multimedia reproduction, and so forth, can be executed through a mobile communication terminal, a display device equipped with a touch screen has become a popular choice for many users.

As a user manipulates the touch screen for operation, a long-term use of the portable terminal can cause damage and scratches on the surface of a window member, thus degrading the quality of the touch screen. Accordingly, much efforts have been made to prevent a window member of the touch screen from being damaged.

A window member of the touch screen is typically fabricated using an acryl sheet, a high-polymer film, etc., or injection molding using acryl. However, the window member fabricated using such high-polymer synthetic resin has low surface quality or clarity, and particularly, low surface durability. These factors are drawbacks and limitations in operation.

To reinforce the durability (i.e., hardness) of the surface of the window member fabricated using a high-polymer synthetic resin material, a coating may be applied thereto, but the coating of the window member surface may not guarantee the surface uniformity of the window member. When a non-uniform surface is applied to the display device, a distortion of the screen occurs.

Alternatively, to prevent the surface of the window member from being damaged, the window member may be fabricated using a tempered glass. In spite of excellent surface quality, transmissivity, clarity, etc., the tempered glass requires repetitive processes until it is made into a window member of desired standard and quality, thus resulting in a high fabrication cost. Moreover, its yield is low due to generation of defective products caused by chips from the manufacture process.

As explained above, when the surface of the window member is implemented with a curved surface, it becomes more difficult to guarantee the surface quality of the window member fabricated using a synthetic resin material. Also, when the window member is fabricated using a tempered glass, its processing becomes more complicated, thereby increasing a fabrication cost or the like.

SUMMARY OF THE INVENTION

Accordingly, an aspect of the present invention is to provide a method for fabricating a window member having a curved surface for a portable terminal display capable of providing an excellent surface quality while maintaining a sufficient hardness.

Another aspect of the present invention is to provide a method for fabricating a window member having a curved surface which reduces a fabrication cost through a simplification of fabrication process while maintaining a sufficient hardness and an excellent surface quality.

According to another aspect of the present invention, a method for fabricating a window member for a display device of a portable terminal includes: fabricating a high-hardness sheet to be attached to a surface of the window member ('sheet fabrication step'), fabricating a body of the window member with high-polymer synthetic resin ('body fabrication step'), and coupling the high-hardness sheet to an outer surface of the body ('attaching step'), in which the outer surface of the body is formed to have a curved surface in the body fabrication step.

According to yet another aspect of the present invention, a method for producing a window member for a portable terminal display device includes: providing a high-hardness sheet substantially defining a shape of the window member from a sheet material made of an organic/inorganic complex material or a glass material; fabricating a body of the window member having a curved shape with a high-polymer synthetic resin via an injection molding process; and coupling the high-hardness sheet to the fabricated body of the window member.

BRIEF DESCRIPTION OF THE DRAWINGS

The above and other features and advantages of exemplary embodiments of the present invention will be more apparent from the following detailed description taken in conjunction with the accompanying drawings, in which:

FIGS. 3A through 3D are diagrams showing a window member fabricated by the method shown in FIG. 1 or 2;

DETAILED DESCRIPTION OF THE INVENTION

Hereinafter, exemplary embodiments of the present invention will be described in detail with reference to the accompanying drawings. For the purposes of clarity and simplicity, well-known functions and structures will not be described as they unnecessarily obscure the subject matter of the present invention.

Figure 1:
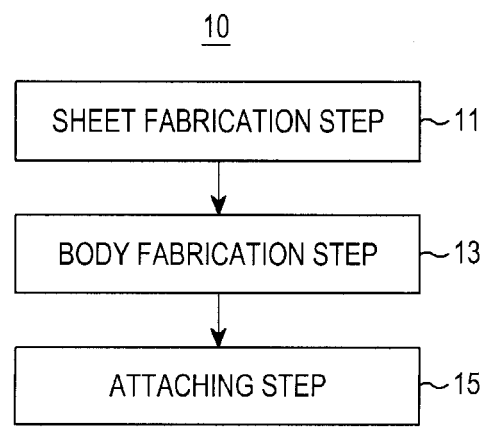
FIG. 1 is a flowchart of a method for fabricating a window member for a display device of a portable terminal according to an embodiment of the present invention.

FIG. 1 is a flowchart of a method 10 for fabricating a window member of a portable terminal according to an embodiment of the present invention.

As shown, the window fabrication method 10 may include sheet fabrication step 11 for processing a high-hardness sheet (33 shown in FIG. 4A) suitable for a window member to be fabricated from a sheet material, step 13 for fabricating a body of the window member, and step 15 for coupling the fabricated high-hardness sheet to the fabricated body of the window member.

Figure 4A:
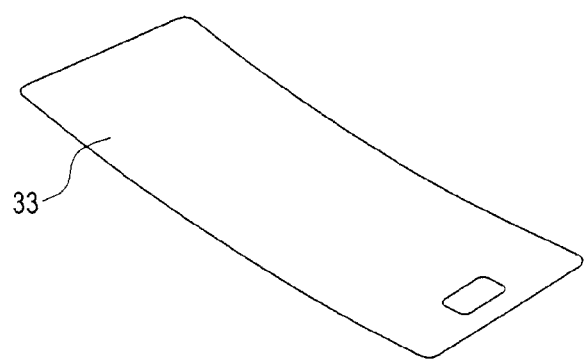
FIGS. 4A and 4B are perspective views showing a high-hardness sheet processed during fabrication of a window member according to the method shown in FIG. 1 or 2 and a laminating jig which can be used during fabrication of the window member.
Figure 4B:
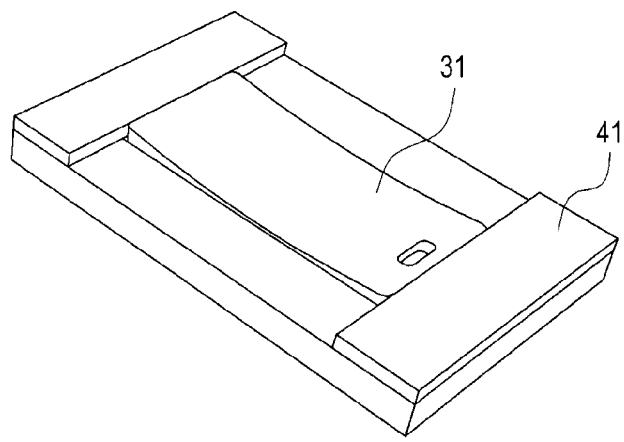
Figure 5:
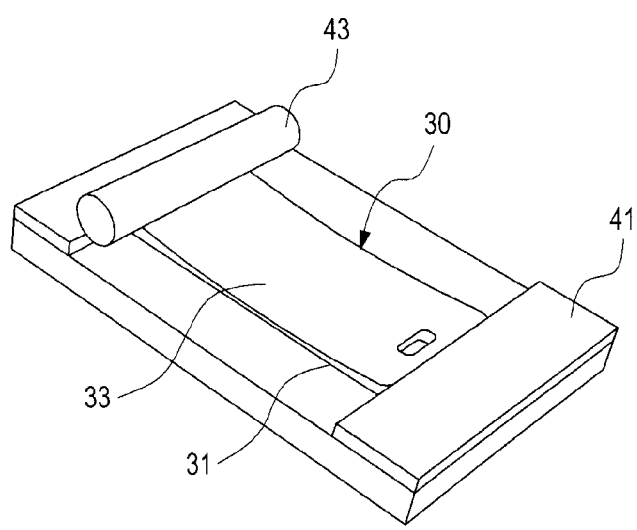
FIG. 5 is a perspective view showing a process of attaching a high-hardness sheet to a body of a window member during fabrication of the window member according to the method shown in FIG. 1 or 2.

Referring to FIGS. 4A through 5, a high-hardness sheet 33 is attached to an outer surface of the body 31, and the body 31 has a curved surface. As such, when the window member 30 is mounted on a portable terminal, a side of the body 31 on an outer surface would yield a curved side shape.

Referring back to FIG. 1, the sheet fabrication step 11 involves fabricating a high-hardness sheet by processing the sheet material made of an organic/inorganic complex material or a glass material having a hardness of 9H or more with respect to pencil hardness and a thickness of 0.2 mm or less. The organic/inorganic complex material is a polyester-group high-polymer film of which both surfaces are coated by UV curing resin to which a silica nano-filler is added. Such a sheet material is fabricated to have a thickness of 0.2 mm or less, thus guaranteeing a hardness of 9H or more while minimizing strain stress during an attachment of the finished high-hardness sheet to the body of the window member or during a double injection of the finished high-hardness sheet.

To fabricate the high-hardness sheet suitable for the window member, a design of the high-hardness sheet at a desired standard is printed onto a sheet material made of an organic/inorganic complex material or a glass material, and then the sheet material is processed according to the printed design. The sheet material may be processed by using a lathe, more specifically, a Computerized Numerical Control (CNC) lathe. Here, the sheet metal process using the CNC lathe is preferably performed on conditions of a CNC lathe rotating speed of 40,000 rpm or more to 60,000 rpm or less, and a CNC lathe transferring speed of 400 mm/min or more to 600 mm/min or less. Prior to processing of the sheet material, a bezel or a manufacturer's symbol may be printed onto an edge portion of the high-hardness sheet to be fabricated.

If the bezel or the manufacturer's symbol is printed onto the high-hardness sheet, various structures may be formed on the body 31 of the window member 30. A conventional window member is fabricated by using injection molding or processing tempered glass, and the bezel or the manufacturer's symbol is printed onto an inner side of the fabricated window member or attached in the form of a separate film. As a result, it is not possible to form a separate structure in the inner side of the conventional window member. Further, to couple the window member to a housing of the portable terminal, a both-sided tape or an adhesive is used in the past.

In the window member fabrication method according to the present invention, the high-hardness sheet is attached to an outer side of the body of the window member, and the bezel or the manufacturer's symbol may be printed onto the high-hardness sheet, such that various structures can be formed in the inner side of the body. Therefore, the window member can be assembled to a product such as a portable terminal, without using an adhesive material such as a both-sided tape as in the prior art.

The body fabrication step 13 involves fabricating a body 31 of the window member 30 with high-polymer synthetic resin, more specifically, polymethylmethacrylate (PMMA) resin or polycarbonate (PC) resin, preferably by using injection molding. The PMMA resin or PC resin, because of becoming transparent after cured, is suitable for the window member provided to the display device. Referring to FIG. 4, the body 31 substantially defines the shape of the window member 30. The high-hardness sheet 33 finished in the sheet fabrication step 11 is attached to an outer surface of the body 31. Here, the sheet fabrication step 11 and the body fabrication step 13 are performed through a separate process, and thus these steps do not need to be sequentially performed.

Figure 7:
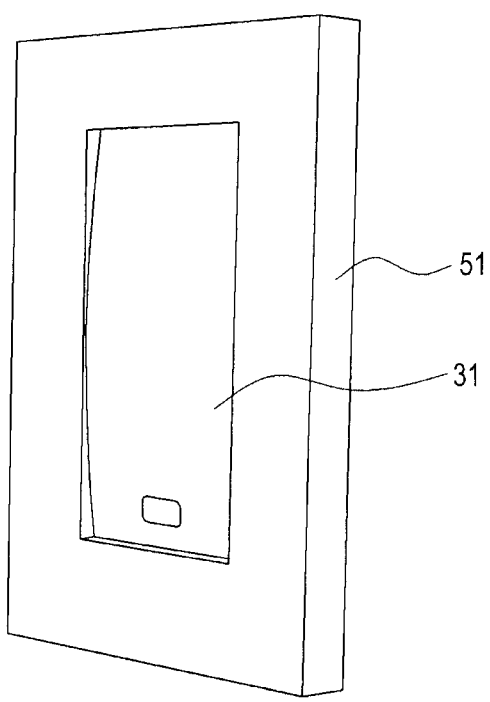
FIG. 7 is a perspective view showing a mold used in double injection during fabrication of the window member according to the method shown in FIG. 1 or 2.

In an alternate embodiment, if the high-hardness sheet 33 can sufficiently endure heat and pressure during an injection molding process, the high-hardness sheet 33 can be preinstalled in the inner side of a mold 51 (see FIG. 7) when fabricating of the body 31, and thus can be attached to the body 31 simultaneously with molding of the body 31 through a double injection. In other words, although step 15 of attaching the high-hardness sheet 33 to the body 31 is separately shown in FIG. 1, the window member fabrication method 10 according to an embodiment shown in FIG. 1 may simultaneously perform the body fabrication step 13 and the attaching step 15 through a double injection.

To attach the high-hardness sheet 33 to the body 31, a roll lamination process may be used in lieu of the above double injection. That is, the high-hardness sheet 33 can be positioned on the outer surface of the body 31 and attached to the body 31 by pressurization with a roller 43 (see FIG. 5). To perform the roll lamination process, an adhesive material is preferably disposed between the high-hardness sheet 33 and the body 31. To this end, an Optical Clear Adhesive (OCA) film and an UV curing adhesive can be used to attach the high-hardness sheet 33 to the body 31.

Figure 2:
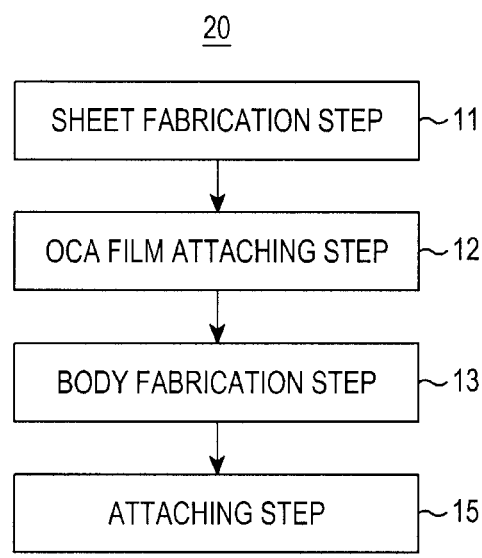
FIG. 2 is a flowchart of a method for fabricating a window member of a portable terminal according to another embodiment of the present invention.

Referring to FIG. 2, to attach the high-hardness sheet 33 to the body 31 using the OCA film, the OCA film is attached to the sheet material before processed to the high-hardness sheet 33, or the OCA film is attached to a rear side of the finished high-hardness sheet 33. Such attachment of the high-hardness sheet 33 to the body 31 is performed by a roll lamination process, that is, transferring the high-hardness sheet 33 and the OCA film while pressurizing the high-hardness sheet 33 and the OCA film which faces the rear side of the high-hardness sheet 33 with a roller. A thickness of the OCA film is preferably less than 100 micrometer, and to improve adhesive strength, the rear side of the high-hardness sheet 33 may be nitrogen-plasma-processed before the OCA film is attached thereto.

After the OCA film is attached to the high-hardness sheet 33, the high-hardness sheet 33 is disposed such that the OCA film faces the outer surface of the fabricated body 31, and then the roll lamination process is performed. Referring to FIGS. 4A through 5, when the body 31 is disposed on a separate jig 41 used in the roll lamination process, a pressurization is applied by a roller 43 and the jig 41 is transferred such that the high-hardness sheet 33 is attached to the body 31.

If there are bubbles between the high-hardness sheet 33 and the OCA film or between the OCA film and the surface of the body 31 after the attachment of the high-hardness sheet 33 to the body 31, the bubbles are preferably removed using an autoclave. To this end, the body 31 to which the high-hardness sheet 33 is attached is placed in the inner side of the autoclave and is left for a period of 40 minutes or more and 1 hour or less, at the pressure of 10 kgf/cm$^2$ or more and 15 kgf/cm$^2$ or less, thereby removing the bubbles.

Figure 6:
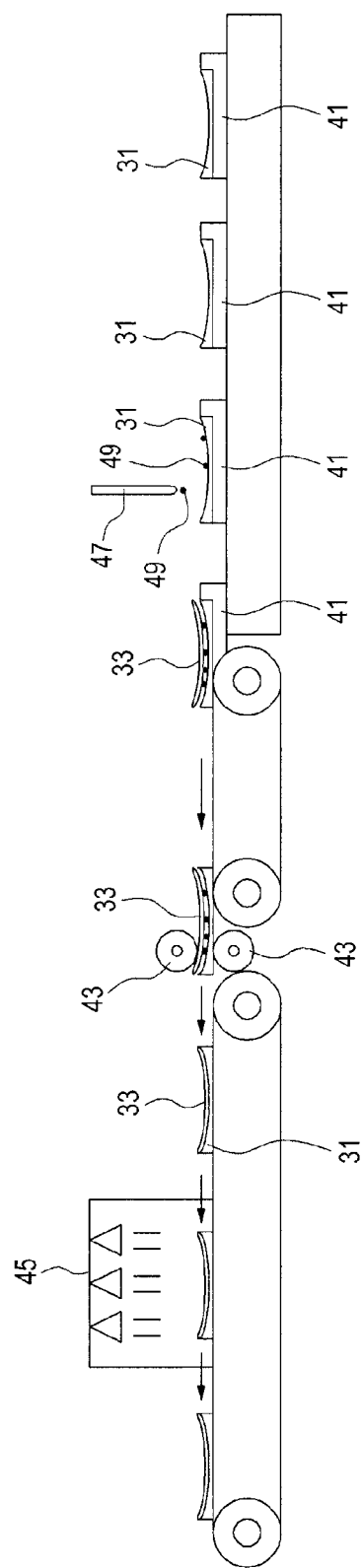
FIG. 6 is a diagram showing a process of attaching a high-hardness sheet to a body of a window member through ultraviolet (UV) curing during fabrication of the window member according to the method shown in FIG. 1 or 2.

The process of attaching the high-hardness sheet 33 to the body 31 using an UV curing adhesive is shown in FIG. 6. As shown, the process of attaching the high-hardness sheet 33 to the body 31 using an UV curing adhesive is performed on a conveyer belt on which an adhesive distributer 47, the roller 43, and an UV curing chamber 45 are sequentially disposed in that order.

When the body 31 of the window member 30 is disposed on the jig 41, the jig 41 is transferred and an UV curing adhesive 49 is applied onto the outer surface of the body 31 in a predetermined pattern via an adhesive distributer 47. When the body 31 onto which the UV curing adhesive 49 is applied is transferred to the roller 43, the high-hardness sheet 33 is disposed on the outer surface of the body 31, and the body 31 is continuously transferred and passes through the roller 43. The roller 43 pressurizes the high-hardness sheet 33 to urge the high-hardness sheet 33 to closely contact the body 31. UV curing adhesive leaking through edges of the body 31 and the high-hardness sheet 33 is preferably removed using a solvent such as ethanol. Thereafter, the body 31 having passed through the roller 43 goes to the UV curing chamber 45 in which the UV curing adhesive 49 between the high-hardness sheet 33 and the body 31 is cured, such that the high-hardness sheet 33 is completely attached to the body 31.

FIGS. 3A through 3D show the window member 30 that may be fabricated through the foregoing process. FIG. 3A is a plane view of the window member 30, in which a bezel 37 printed onto the high-hardness sheet 33 is disposed around a transparent window 35. On the inner side of the window member 30, more particularly, on the inner side of the body 31 may be formed structures for binding to a housing, etc., of a portable terminal and the structures for binding to the housing are hidden by the bezel 37. FIGS. 3B, 3C, and 3D are side views of the window member 30, and different curved shapes of the outer side of the window member 30 that may be formed using the foregoing process.

As can be appreciated from the foregoing description, the method for fabricating a window member for a display device of a portable terminal according to the present invention attaches the high-hardness sheet to the body of the window member, thus easily securing surface hardness. Moreover, the window member is fabricated through an injection molding, and the high-hardness sheet is attached to the window member through a roll lamination or a double injection, such that surface quality such as surface uniformity can be easily achieved. Furthermore, a separate surface process suing a tempered glass is not necessary as in the prior art, which in turn allows a mass production of the window member at a low cost. In addition, since the body of the window member is fabricated through an injection molding, the window member having various shapes of a curved surface may be formed. Moreover, by printing a logo of a manufacturer or a common carrier onto the high-hardness sheet, various structures formed in the edge of the body of the window member can be hidden, thus making it easy to form structures for assembly of the window member.

While detailed embodiments have been described in the present invention, it would be obvious to those of ordinary skill in the art that various changes may be made without departing from the scope of the present invention.

What is claimed is:

1. A method for fabricating a window member for a display device of a portable terminal and for assembly of the fabricated window member to a housing of the portable terminal, the method comprising:

fabricating a high-hardness sheet;

fabricating a body of the window member with a high-polymer synthetic resin;

providing a bezel or design onto the high-hardness sheet such that the bezel or design is disposed around the window member;

and coupling the high-hardness sheet to an outer surface of the body, wherein the outer surface of the body is formed to have a curved surface when fabricating the body, assembling the window member to the housing of the portable terminal without an adhesive material there between, wherein the fabricating of the high-hardness sheet is performed according to a printed design via a Computerized Numerical Control (CNC) process.

2. The method of claim 1, further comprising attaching an Optical Clear Adhesive (OCA) film onto a rear side of the high-hardness sheet prior to the coupling step.

3. The method of claim 2, wherein the attaching of the OCA film onto the rear side of the high-hardness sheet is performed via a roll lamination process.

4. The method of claim 2, wherein the attaching step is performed via a roll lamination process when the OCA film attached to the high-hardness sheet is disposed to face the outer surface of the body.

5. The method of claim 2, further comprising removing bubbles between the high-hardness sheet and the body in an autoclave for a period of 40 minutes or more and 1 hour or less and at a pressure of 10 kgf/cm$^2$ or more and 15 kgf/cm$^2$ or less.

6. The method of claim 1, wherein the fabricating a body of the window member is performed through an injection molding by injecting the high-polymer synthetic resin into a mold and curing the high-polymer synthetic resin.

7. The method of claim 6, wherein in the fabricating a body of the window member, the fabricated high-hardness sheet is disposed in the mold to perform the coupling step simultaneously with molding of the body.

8. The method of claim 1, wherein coupling the high-hardness sheet to an outer surface of the body comprises:

placing the fabricated body in a laminating jig;

applying an ultraviolet (UV) curing adhesive to the outer surface of the body; and positioning the fabricated high-hardness sheet on the outer surface of the body and performing a roll lamination process.

9. The method of claim 8, further comprising removing the UV curing adhesive leaking through edges of the body and irradiating UV rays onto the body on which the high-hardness sheet is positioned.

10. The method of claim 1, wherein the high-polymer synthetic resin for fabricating the body of the window member is a polymethylmethacrylate (PMMA) resin or polycarbonate (PC).

11. The method of claim 1, wherein the CNC process is performed at a CNC lathe rotating speed of 40,000 rpm or more to 60,000 rpm or less, and at a CNC lathe transferring speed of 400 mm/min or more to 600 mm/min or less.

12. A method for producing a window member for a portable terminal display device and for assembly of the produced window member to a housing of the portable terminal, comprising:

providing a high-hardness sheet substantially defining a shape of the window member from a sheet material made of an organic/inorganic complex material or a glass material;

providing a bezel or design onto the high-hardness sheet such that the bezel or design is disposed around the window member;

fabricating a body of the window member having a curved shape with a high-polymer synthetic resin via an injection molding process; and coupling the high-hardness sheet to the fabricated body of the window member, and assembling the window member to the housing of the portable terminal without an adhesive material there between, and providing the bezel or design onto the sheet material and fabricating the body according to a printed design via a Computerized Numerical Control (CNC) process.

13. The method of claim 12, further comprising attaching an Optical Clear Adhesive (OCA) film onto a rear side of the high-hardness sheet prior to the coupling step.

14. The method of claim 13, wherein the attaching of the OCA film onto the rear side of the high-hardness sheet is performed via a roll lamination process.

15. The method of claim 13, further comprising removing bubbles between the high-hardness sheet and the body in an autoclave.

16. The method of claim 12, wherein the organic/inorganic complex material or the glass material comprises a hardness of 9H or more with respect to a pencil hardness and a thickness of 0.2 mm or less.

17. The method of claim 12, wherein the organic/inorganic complex material is made by applying UV curing resin to which a silica nano-filler is added onto both surfaces of a polyester-group high-polymer film.

18. The method of claim 12, wherein the high-polymer synthetic resin for fabricating the body of the window member is a polymethylmethacrylate (PMMA) resin or polycarbonate (PC).

* * * * *